(12) United States Patent
Hildreth

(10) Patent No.: US 9,030,564 B2
(45) Date of Patent: May 12, 2015

(54) SINGLE CAMERA TRACKER

(75) Inventor: Evan Hildreth, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 908 days.

(21) Appl. No.: 12/578,505

(22) Filed: Oct. 13, 2009

(65) Prior Publication Data

US 2010/0091110 A1    Apr. 15, 2010

Related U.S. Application Data

(60) Provisional application No. 61/104,340, filed on Oct. 10, 2008.

(51) Int. Cl.
*H04N 5/225* (2006.01)
*G06F 3/042* (2006.01)
*G06F 3/01* (2006.01)
*G06K 9/00* (2006.01)

(52) U.S. Cl.
CPC .............. *G06F 3/0428* (2013.01); *G06F 3/011* (2013.01); *G06K 9/00355* (2013.01)

(58) Field of Classification Search
CPC ... G06F 3/011; G06F 3/0428; G06K 9/00355; G06K 9/00624; G06K 9/2036
USPC .................................. 348/169; 382/103, 154
See application file for complete search history.

(56) References Cited

U.S. PATENT DOCUMENTS 7,574,020 B2 * 8/2009 Shamaie ........................ 382/103
2003/0052859 A1    3/2003 Finley
2004/0036717 A1 * 2/2004 Kjeldsen et al. ............... 345/730
2004/0189720 A1 * 9/2004 Wilson et al. .................. 345/863
2005/0201613 A1 * 9/2005 Mostafavi ...................... 382/154
2006/0187196 A1    8/2006 Underkoffler et al.
2006/0267927 A1 * 11/2006 Crenshaw et al. ............. 345/156
2007/0165007 A1 * 7/2007 Morrison et al. .............. 345/175
2008/0150898 A1 * 6/2008 Low et al. ...................... 345/166
2008/0259162 A1 * 10/2008 Aoki et al. ..................... 348/159
2008/0273755 A1 * 11/2008 Hildreth ......................... 382/103
2009/0006292 A1 * 1/2009 Block ............................. 706/20
2009/0020342 A1 * 1/2009 Oleskevich et al. ........ 178/18.03

(Continued)

FOREIGN PATENT DOCUMENTS

JP      H06309100 A     11/1994
JP         3080041 U     9/2001
JP      2002312123 A    10/2002

(Continued)

OTHER PUBLICATIONS

International Search Report & Written Opinion issued in International Application No. PCT/US09/60548, mailed Dec. 24, 2009, 11 pages.

(Continued)

*Primary Examiner* — Abdullahi Salad
(74) *Attorney, Agent, or Firm* — Kilpatrick Townsend & Stockton LLP

(57) ABSTRACT

A camera tracker, in which an image captured by a camera oriented to capture images across a surface is accessed. A region in which an object detected within the accessed image is positioned is determined from among multiple defined regions within a field of view of the camera. User input is determined based on the determined region and an application is controlled based on the determined user input.

20 Claims, 17 Drawing Sheets

(56) References Cited

U.S. PATENT DOCUMENTS

| | | | |
|---|---|---|---|
| 2009/0207383 A1* | 8/2009 | Hirahara et al. | 353/69 |
| 2010/0060720 A1* | 3/2010 | Hirasawa | 348/49 |

FOREIGN PATENT DOCUMENTS

| | | | |
|---|---|---|---|
| JP | 2005135329 A | 5/2005 | |
| JP | 2008186374 A | 8/2008 | |
| WO | WO-02054169 A2 | 7/2002 | |
| WO | WO-2005057398 A2 | 6/2005 | |

OTHER PUBLICATIONS

Supplementary European Search Report—EP09820054—Search Authority—The Hague—Apr. 17, 2014.

* cited by examiner

SINGLE CAMERA TRACKER

CROSS-REFERENCE TO RELATED APPLICATIONS

This application claims the benefit of U.S. Provisional Application No. 61/104,340, filed Oct. 10, 2008, which is incorporated by reference.

FIELD

The present disclosure generally relates to object tracking.

BACKGROUND

Cameras have been used to capture images of objects. Techniques have been developed to analyze one or more images of an object present within one or more images to detect a position of the object. For example, optical flow has been used to detect motion of an object by analyzing multiple images of the object taken successively in time.

SUMMARY

In one aspect, an electronic device includes a camera oriented to capture images across a surface and a processing unit configured to perform operations. The operations include accessing an image captured by the camera and identifying multiple regions that are defined within a field of view of the camera and that each correspond to one interface control positioned on the surface. The operations also include determining, from among the multiple defined regions, a region in which an object detected within the accessed image is positioned. The operations further include determining user input based on the one interface control that corresponds to the determined region and controlling an application based on the determined user input.

Implementations may include one or more of the following features. For example, the operations may include detecting an object within the accessed image and determining a position of the detected object within the accessed image. In this example, the operations also may include comparing the determined position to the multiple defined regions within the field of view of the camera and, based on comparison results, identifying the region in which the detected object is positioned.

In some implementations, the operations may include segmenting the accessed image into segments that each correspond to one of the multiple defined regions and, for each of the segments, analyzing the segment to determine whether an object is present within the segment. In these implementations, the operations also may include, in response to a determination that an object is present within a particular segment, determining that the object is positioned within a particular region that corresponds to the particular segment. In addition, in these implementations, the operations may include determining that the entire object is present within any portion of the particular region. The segment may be the only portion of the image analyzed to determine whether an object is present within the segment.

In some examples, the electronic device may include a display screen configured to display a graphical user interface that includes a first user interface control displayed at a first position in the graphical user interface and a second user interface control displayed at a second position in the graphical user interface. The second position in the graphical user interface may be different than the first position in the graphical user interface and the camera is oriented to capture images across a surface of the display screen. In these examples, the operations may include determining whether an object is present within a first region of the image that corresponds to the first user interface control and determining whether an object is present within a second region of the image that corresponds to the second user interface control. Further, in these examples, the operations may include, in response to a determination that an object is present within the first region of the image, detecting activation of the first user interface control and triggering a first operation associated with activation of the first user interface control. The operations also may include, in response to a determination that an object is present within the second region of the image, detecting activation of the second user interface control and triggering a second operation associated with activation of the second user interface control.

Further, the operations may include controlling the display screen to size and shape the first user interface control to fit within the first region of the image and to size and shape the second user interface control to fit within the second region of the image. The first user interface control may be a first user interface button and the operations may include detecting a press of the first user interface button and triggering a first operation associated with a press of the first user interface button.

The first user interface control may be a first slider control that spans the first region of the image in a direction that intersects a field of view of the camera and the operations may include detecting engagement of the first slider control in response to a determination that an object is present within the first region of the image. The operations also may include determining a position of the object within the first region of the image along the first slider control and triggering a first operation that is associated with engagement of the first slider control and that uses the determined position of the object within the first region of the image along the first slider control.

In some implementations, the electronic device may include a light emitting diode oriented to direct light across the surface of the display screen in a direction that intersects the first region of the image and the second region of the image. In these implementations, the light emitting diode may direct light across a part of the first region of the image to define an active area in the part of the first region of the image in which the light from the light emitting diode is directed and a false area in a remainder of the first region of the image in which light from the light emitting diode is absent. The first position in the graphical user interface at which the first user interface control is displayed may correspond to the active area of the first region of the image. The operations may include determining whether an illuminated object is present within the first region of the image to detect objects in the active area of the first region of the image and ignore objects in the false area of the first region of the image.

In some examples, the light emitting diode is a first light emitting diode configured to illuminate a first area above the display screen and the electronic device includes a second light emitting diode oriented to direct light across the surface of the display screen and configured to illuminate a second area above the display screen that is different than the first area above the display screen illuminated by the first light emitting diode. In these examples, the second area above the display screen illuminated by the second light emitting diode defines a gesture input area and the operations may include detecting gestures within the second area based on an analysis of multiple images captured by the camera.

In addition, the operations may include controlling the first light emitting diode and the second light emitting diode to illuminate at alternating times in sequence with images captured by the camera. The images captured by the camera may result in a first set of images in which the first light emitting diode is illuminated and the second light emitting diode is not illuminated and a second set of images in which the second light emitting diode is illuminated and the first light emitting diode is not illuminated. The operations may include processing the first set of images in which the first light emitting diode is illuminated and the second light emitting diode is not illuminated to detect activation of the first user interface control and processing the second set of images in which the first light emitting diode is not illuminated and the second light emitting diode is illuminated to detect gestures within the second area.

In some examples, the operations may include ignoring portions of the image other than the multiple defined regions of the image. In these examples, objects located in portions of the image other than the multiple defined regions of the image are ignored.

In some implementations, the operations may include detecting performance of a gesture by an object within the region of the image based on an analysis of multiple images captured by the camera, determining a user input command that corresponds to the detected gesture, and triggering a first operation that corresponds to the determined user input command. In these implementations, the operations may include detecting performance of a swiping gesture within the region of the image and a direction of the swiping gesture and determining a user input command that corresponds to the swiping gesture in the determined direction of the swiping gesture.

In another aspect, at least one computer-readable storage medium encoded with executable instructions that, when executed by at least one processor, cause the at least one processor to perform operations. The operations include accessing an image captured by a camera oriented to capture images across a surface and identifying multiple regions that are defined within a field of view of the camera and that each correspond to one interface control positioned on the surface. The operations also include determining, from among the multiple defined regions, a region in which an object detected within the accessed image is positioned. The operations further include determining user input based on the one interface control that corresponds to the determined region and controlling an application based on the determined user input.

In yet another aspect, a method includes accessing an image captured by a camera oriented to capture images across a surface and identifying multiple regions that are defined within a field of view of the camera and that each correspond to one interface control positioned on the surface. The method also includes determining, from among the multiple defined regions, a region in which an object detected within the accessed image is positioned. The method further includes determining user input based on the one interface control that corresponds to the determined region and controlling an application based on the determined user input.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers represent corresponding parts throughout.

DETAILED DESCRIPTION

Figure 1:
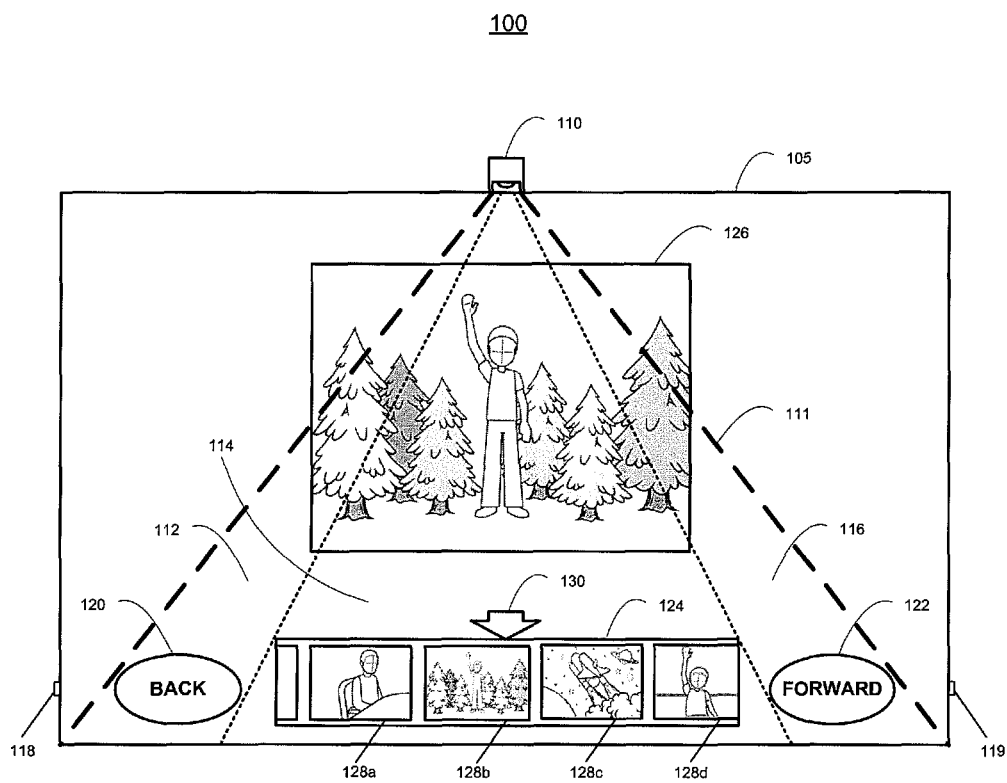
FIGS. 1, 2, 4A, 4B, 5-13, 16, and 17 illustrate example systems.

Techniques are described for emulating a two-dimensional interface using a one-dimensional sensor. In some implementations, a system may include a single camera that images a surface of a touch screen interface. In these implementations, the system detects a position of objects in images captured by the single camera in a single dimension (e.g., a horizontal direction when the single camera is placed at the top of the touch screen interface and images downward, such as shown in FIG. 1) and uses the single dimension to control the touch screen interface in two dimensions. Although two sensors (e.g., two cameras) are traditionally needed to provide two-dimensional control, the system is able to control the touch screen interface in two dimensions using the single dimension of the detected object based on intelligent placement of interface elements in the touch screen interface and/or use of illumination sources to define active areas in the touch screen interface. Because, in these implementations, only a single sensor (e.g., a single camera) is needed to provide two-dimensional control, the system may have a lower cost than systems that require two sensors.

FIG. 1 illustrates a system 100 for controlling a user interface. The system 100 is configured to detect a position of an object touching or hovering above a surface of a display device 105. The display device 105 may be, for example, a computer monitor or a television screen. The object may be, for example, a user's hand or finger, a stylus or other pointing device, or some other object.

The system 100 includes a camera 110 configured to capture images of objects positioned in front of the display device 105. The camera 110 may be placed at the top of the display 105 and oriented to look down along the surface of the display 105. A field-of-view 111 of the camera 110 is a triangular shape, widening downward along the display 105. That is, the camera 110 is positioned such that it may be able to capture images of objects across the entire bottom of the display 105 but may only be able to capture a smaller area of the top of the display 105. The field-of-view 111 may be divided into multiple regions 112-116. The regions 112-116 each may be defined, for example, as an angle or as a range of angles within the field-of-view 111. As another example, the regions 112-116 each may be defined as a portion of an image captured by the camera 110. As shown in FIG. 1, defined regions 112-116 may be of different sizes.

The system 100 includes LEDs (Light Emitting Diodes) 118-119. In some implementations, illuminating sources other than LEDs may be used. The LEDs 118-119 may be positioned to define an active touch region of the field-of-view 111, such that when the LEDs 118-119 are illuminated, only objects positioned in the active touch region are detected. An active touch area may be defined, for example, at the bottom of the display device 105.

The display device 105 may a render display image generated by an application, where the display image includes one or more user input controls. Each user input control may be placed, for example, in the active touch area (e.g., an area corresponding to the bottom of the display device 105) and may be associated with a defined region of the field-of-view 111. For example, a "BACK" button control 120 is displayed at the bottom of the display device 105 in an area corresponding to region 112 and a "FORWARD" button control 122 is displayed at the bottom of the display device 105 in an area corresponding to region 116. A filmstrip control 124 is displayed in an area of the display device 105 corresponding to region 114. The filmstrip control 124 is used to control display of images in an image area 126.

As the LEDs 118-119 are illuminated, the camera 110 may capture images of an object (e.g., a user's hand or finger) in front of the display device 105. A region 112-116 corresponding to the captured object may be determined. An application command may be determined based on the determined region and the determined application command may be executed.

For example, if a user points their finger at and touches the filmstrip control 124, the finger may be illuminated by the LEDs 118-119 and captured in an image of the camera 110. Based on the detected horizontal position of the user's finger, it may be determined that the finger was captured in region 114. Based on the determined region 114, an image selection command may be determined. The image selection command may be executed and the horizontal position of the finger may be mapped to a particular thumbnail image 128a-d. The mapped thumbnail image (e.g., 128b) may be displayed in a larger size in the image area 126. An indicator 130 may indicate which thumbnail 128a-d in the filmstrip 124 is displayed in the image area 126 (e.g., the indicator 130 as shown is positioned above the thumbnail 128b).

As another example, if the user points their hand at and touches the "BACK" control button 120, the hand may be illuminated by the LEDs 118-119 and captured by the camera 110 and a corresponding region 112 may be identified. A "previous image" command may be determined based on the identified region 112. The previous image command may be executed, resulting in the display of the thumbnail 128a in the image area 126 and in the positioning of the indicator 130 above the thumbnail 128a. Previously unseen images may be revealed in the filmstrip 124 if the user repeatedly touches the "BACK" control button 120.

As yet another example, if the user points a stylus at and touches the "FORWARD" button control 122, the stylus may illuminated and captured in a camera image. The region 116 may be determined as a corresponding region and a "next image" command may be determined based on the determined region 116. The next image command may be executed, resulting in the display of the thumbnail 128c in the image area 126 and in the positioning of the indicator 130 above the thumbnail 128c. Previously unseen images may be revealed in the filmstrip 124 if the user repeatedly touches the "FORWARD" control button 122.

In addition to simply capturing the presence of an object in front of the display device 105, a gesture made with the object may be detected. For example, a "swiping left", "swiping right", or "stationary" gesture may be recognized. A gesture may be recognized by comparing motion of the detected object to motion patterns associated with recognized gestures. A recognized gesture may be mapped to an input command. For example, a "swiping left" gesture may be mapped to a "next image" command and a "swiping right" gesture may be mapped to a "previous image" command. A "stationary" gesture may be mapped, for example, to a display menu command.

As used herein throughout, a "gesture" is intended to refer to a form of non-verbal communication made with a whole or part of a human body or multiple human bodies, and is contrasted with verbal communication such as speech. For instance, a gesture may be defined by a movement, change or transformation between a first position, pose, or expression and a second pose, position or expression. Example gestures include for instance, an "air quote" gesture, a bowing gesture, a curtsey, a cheek-kiss, a finger or hand motion, a genuflection, a head bobble or movement, a high-five, a nod, a raised first, a salute, a swiping or wave motion, a thumbs-up motion, or a finger pointing gesture.

Accordingly, from a sequence of images, a gesture may be derived that defines an idea, opinion, emotion, communication, command, demonstration or expression of the user. For instance, the user's gesture may be a single or multiple finger gesture; a single hand gesture; a single hand and arm gesture; a single hand and arm, and body gesture; a bimanual gesture; a change in head pose or posture; a change in a body pose or posture, or a transformation of any other expressive body state.

For brevity, the body part or parts used to perform relevant gestures are generally referred to as a "control object." For instance, the user may express a command using their entire body or with other physical objects, in which case their entire body or the other physical objects may be the control object. A user may more subtly express a command by wiggling a finger, in which case the finger may be the control object. The user's gesture in a single image or between two images may be expressive of an enabling or "engagement" gesture. A control object may also be a physical device, such as an infrared finger light, a retro-reflector, or a remote control.

While gesturing, the user may graze or hover above the display device 105. To perform a swipe gesture, a user may touch the display device 105 and drag the finger towards the left or right in one smooth motion. To perform a stationary gesture, the user may touch or hover above the display device 105 without moving the finger or hand. Gestures may be detected anywhere within the field-of-view 111. In some applications, some or all gestures may not be recognized while interactive button controls are displayed. In some examples, some gestures may be used during the presentation of photographs or videos, so that images can be displayed full screen without overlaying button controls.

Figure 2:
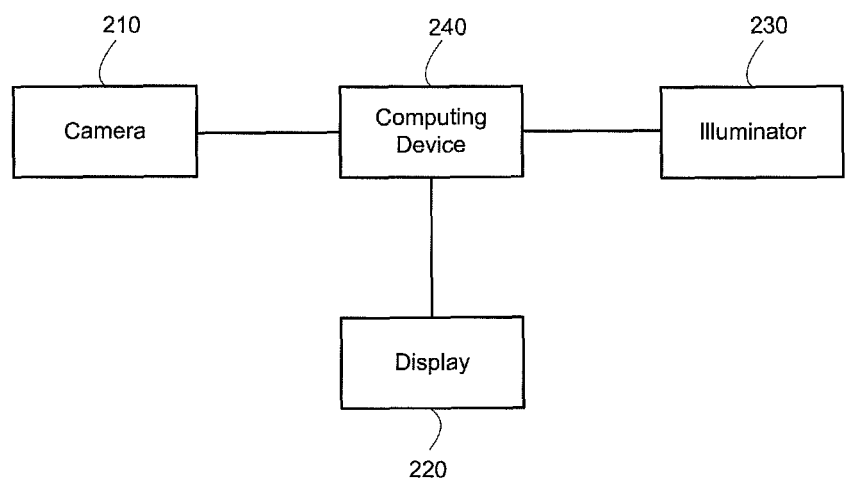

FIG. 2 illustrates an example of a camera tracker system 200. The system 200 includes a camera 210, a display device 220, an illuminator 230, and a computing device 240. The system 200 may be included in or used in conjunction with a digital picture frame, a television, a monitor, a product display unit, or any type of media system.

The camera 210 is a device that captures images. For example, the camera 210 may be a digital camera, a digital video camera, or any other type of device that captures images. In some implementations, the camera 210 may be a single camera and the system 200 may include only the single camera. In other implementations, multiple cameras may be used. The camera 210 may capture images of an object interacting with an interface displayed on the display device 220. For instance, the camera 210 may capture images of a user or person physically interacting (e.g., with a finger or hand) with an interface displayed on the display device 220. The camera 304 may be any type of image sensor and may be a line scan sensor.

The display device 220 renders a visual display image. For example, the display device 220 may be a monitor display, a television display, a liquid crystal display (LCD), a plasma display device, a projector with a projector screen, an auto-stereoscopic display, a cathode ray tube (CRT) display, a digital light processing (DLP) display, a digital picture frame display, or any other type of display device configured to render a visual display image. The display device 220 may include one or more display devices. The display device 220 may display images associated with an application. For instance, the display device 220 may render display images generated by an application (e.g., a photo viewing application). The display images generated by the application may include an interface with interface controls.

In some implementations, the system 200 does not include the display device 220. For example, the system 200 may be configured to detect objects in front of a different surface, such as a surface of another type of physical object such as a door, elevator, machine, radio, media player, or other object. In some examples, the system 200 is located in front of an area of space, such as a doorway or entryway.

The illuminator 230 is a device that provides a light source. For example, the illuminator 230 may be a flash device, an incandescent light bulb, a fluorescent light bulb, a light emitting diode (LED), a halogen light source, a neon light source, a xenon light source, an infrared light source, or any other type of device configured to illuminate an object being imaged by the camera 210. The illuminator 230 may include one or more illuminators. The illuminator 230 may generate light to assist in capturing a high quality image of an object being captured by the camera 210. In some implementations, the illuminator 230 may be used in particular situations. For instance, the illuminator 230 may be used at nighttime or in dark rooms. The illuminator 230 may be positioned to define an active touch area within the field of view of the camera 210. Defining active touch areas using the illuminator 230 may increase the accuracy of object detection with a single camera and also may increase the number of control elements that may be detected by a single camera. Using a single camera may help reduce costs of the system and enable gesture-based input control to be realized in less expensive devices.

The computing device 240 is electrically connected, over a wired or wireless pathway, to the camera 210, the display device 220, and the illuminator 230 and may control operation of the system 200. In some examples, the computing device 240 may include a processor or other control circuitry configured to execute an application. In these examples, the computing device 240 may receive images captured by the camera 210 and process the received images to detect a position of an object (e.g., a user's finger) within the images. The detected position of the object within the images may be tracked and used to control execution of the application. For example, the computing device 240 may compare the detected position of the object within the images with regions defined within the camera's field of view. In this example, the computing device 240 may detect that the object is positioned in a particular region, identify an interface control associated with the particular region, and control an application based on a function corresponding to the identified interface control.

The computing device 240 also may control operation and settings of the camera 210, the display device 220, and the illuminator 230. The computing device 240 may be any type of electronic device that includes a processor or other control circuitry configured to execute instructions.

Figure 3:
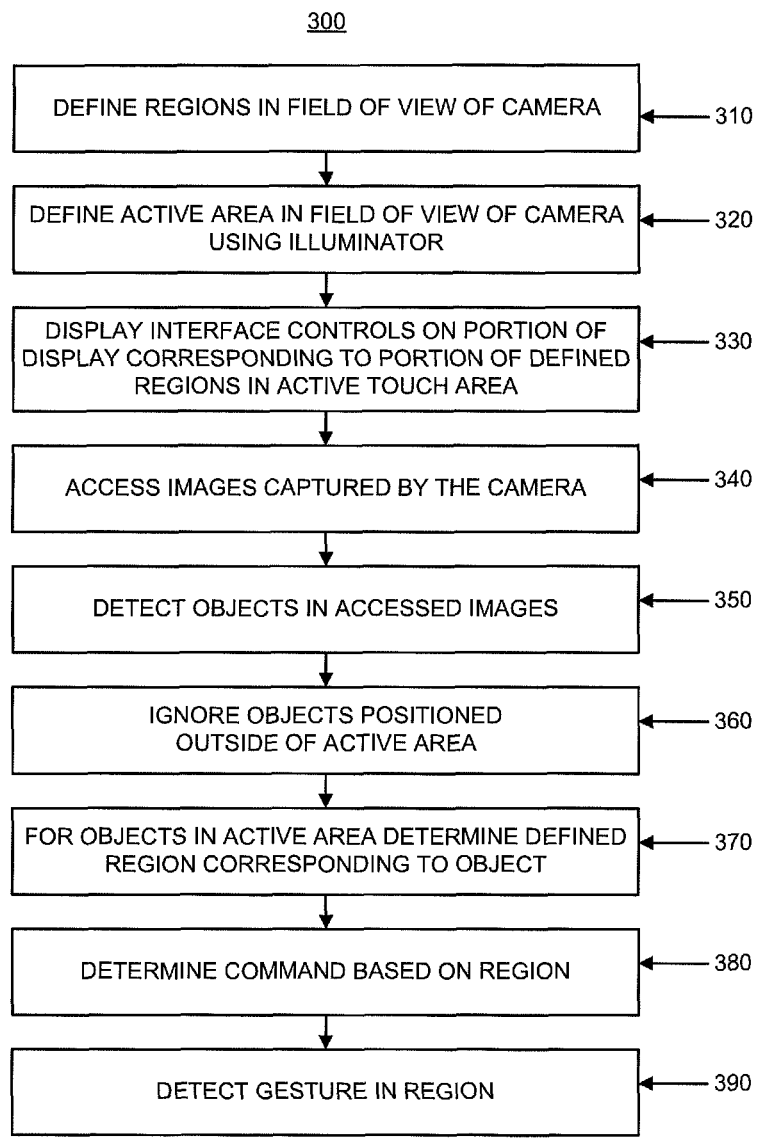
FIGS. 3, 14 and 15 are flowcharts of example processes.

FIG. 3 is a flow chart illustrating an example of a process 300 for determining user input commands in a camera tracker system. For convenience, particular components described with respect to FIG. 2 are referenced as performing the process 300. However, similar methodologies may be applied in other implementations where different components are used to define the structure of the system, or where the functionality is distributed differently among the components.

Figure 4A:
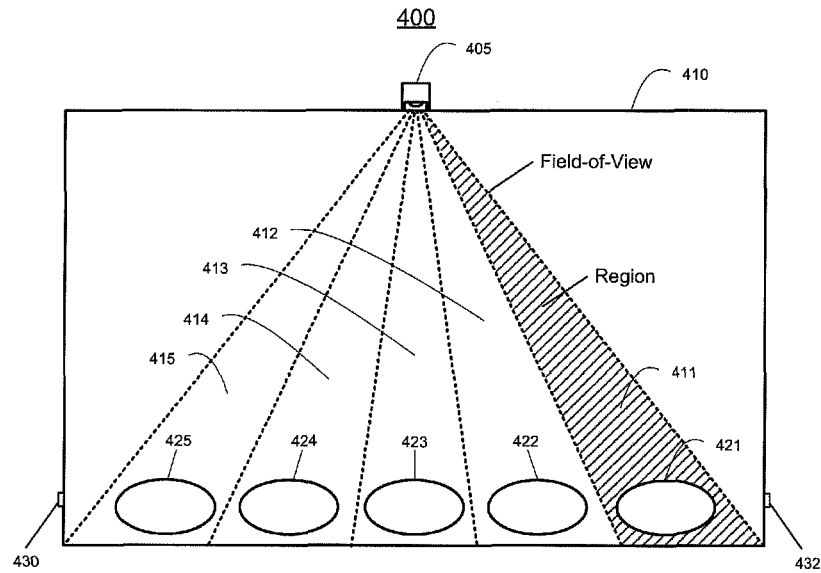

The computing device 240 defines regions in a field of view of the camera 210 (310), and defines an active area in the field of view of the camera 210 using the illuminator 230 (320). The computing device 240 may define multiple regions (e.g., an angle within the field of view of the camera 210, a portion of an image captured by the camera 210, etc.) in the field of view of the camera 210 to correspond with interface control elements displayed on the display device 220. For example, FIG. 4A illustrates a system 400 which includes a camera 405 placed on top of a display device 410. The field-of-view of the camera 405 is divided into regions 411-415. For example, the region 411 is shown with a crosshatch pattern. User interface controls 421-425 are displayed on the display device 410 and correspond to the regions 411-415, respectively.

Returning to FIG. 3, the computing device 240 may define the active touch area in the field of view of the camera 210 by controlling the illuminator 230 to illuminate a portion of the field of view of the camera 210 (e.g., across a surface of the display device 220) that intersects the defined regions (320). For example and as shown in FIG. 4A, LED illuminators 430 and 432 illuminate the bottom portion of the display 410, illuminating the bottom portions of regions 411-415. The LED illuminators 430 and 432 may be infrared LEDs.

Returning to FIG. 3, the computing device 240 renders a display of interface controls on a portion of the display device 220 corresponding to at least a portion of the defined regions in the defined active touch area (330). For example, the computing device 240 may cause the display device 220 to display at least one interface control in each defined region. In this example, the computing device 240 may cause the display device 220 to display the interface controls at a position corresponding to the active touch area defined by the illuminator 230.

For example and as shown in FIG. 4A, the user interface controls 421-425 are displayed on the display device 410, where each control 421-425 is displayed in a portion of the display device 410 corresponding to a respective region 411-415. The user interface controls 421-425 are displayed in the active touch area illuminated by the LEDs 430-432. A control shape and size may be chosen so that controls fit within their corresponding region. For example, oval-sized controls, such as the button controls 421-425, may generally fit well within triangular regions such as the regions 411-415.

Figure 4B:
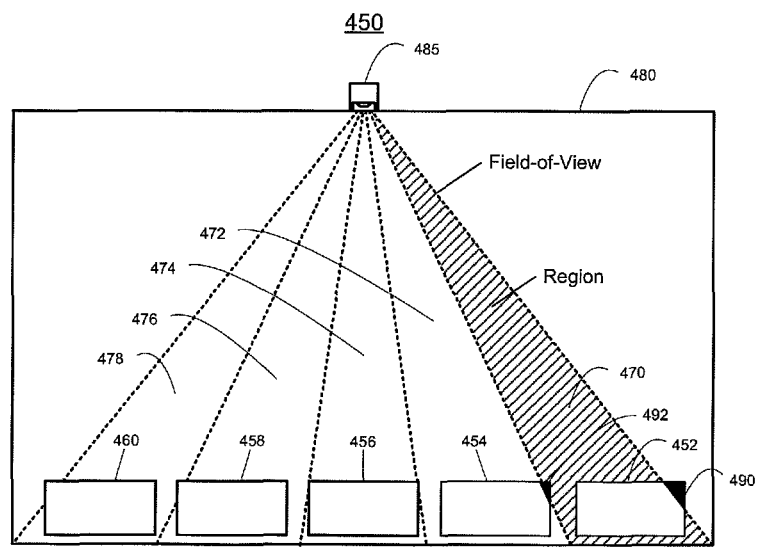

Other types of shapes may not fit particularly well within triangle-shaped or other-shaped regions. For example, FIG. 4B illustrates a system 450 which includes rectangular button controls 452-460 each placed, respectively, into a corresponding region 470-475 of a display device 480, where the regions 470-475 divide the field-of-view of a camera 485. As illustrated in FIG. 4B, rectangular buttons may not fit entirely within their own corresponding region. For example, the rectangle button 452 does not entirely fit within the region 470, as illustrated by a portion 490 that extends outside of the region 471. Similarly, an overlapping portion 492 indicates that the rectangle button 454 does not fit entirely within the region 472 and extends into the region 471. If rectangular buttons are used, they may be spaced apart with sufficient spacing between each button to ensure that each button fits entirely within the corresponding region. A minimum control width, such as one inch, may be used.

Returning to FIG. 3, the computing device 240 accesses images captured by the camera 210 (340). For example, the computing device 240 may receive one or more images from the camera 210. The computing device 240 also may access one or images from a storage medium. The computing device 240 may continuously access images of an area proximate to the system 200 or may access images of an area proximate to the system 200 in response to input commands received by the system 200.

The computing device 240 detects objects in the accessed images (350). For example, the computing device 240 may process or analyze the accessed images to detect a user's finger or another object (e.g., a pointer, a stylus, etc.) in the accessed images. In this example, the computing device 240 may detect a user by comparing features in the accessed images to typical features of objects in images or may detect an object by detecting motion in the accessed images.

The computing device 240 also may detect a user based on skin color analysis of the accessed images (or detect an object having a known color based on color analysis) or may detect an object by comparing a current image including one or more objects with a background model to detect differences between the current image and the background model. The computing device 240 may use any type of technique to detect an object within a single image or within a set of multiple images of the object.

Figure 5:
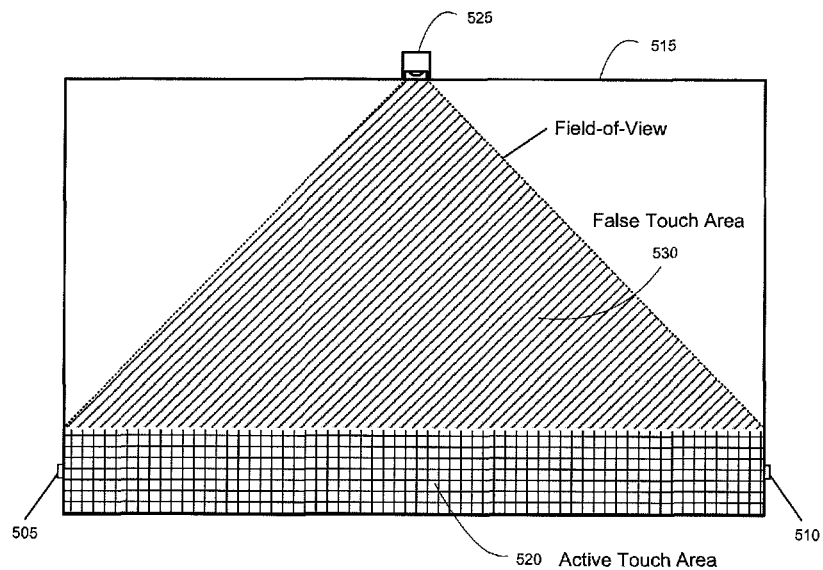

The computing device 240 ignores objects positioned outside of the defined active touch area (360). For example, the computing device 240 identifies objects illuminated by the illuminator 230 and ignores objects that are not illuminated by the illuminator 230. For example and as shown in FIG. 5, LEDs 505-510 illuminate the bottom portion of a display device 515, creating an active touch area 520. The active touch area 520 includes the bottom portion of the field-of-view of a camera 525. A top portion of the field-of-view of the camera 525 is not illuminated by the LEDs 505-510, resulting in a false touch area 530. The computing device 240 may identify objects illuminated in the active touch area 520 and may ignore objects in the false touch area 530. The computing device 240 may ignore objects that are within the false touch area 530 by analyzing an image for illuminated objects. Because any objects within the false touch area 530 are not illuminated, the computing device 240 ignores (e.g., does not detect) these objects.

In some examples, the computing device 240 detects illuminated objects by comparing pixels of the image captured by the camera to a brightness threshold to produce a binary image. For instance, pixels in the camera image having a brightness value above a threshold may be identified in the binary image with a value of one and pixels having a brightness value below the threshold may be identified in the binary image with a value of zero. In these examples, the computing device 240 analyzes the binary image to detect whether one or more objects are present within the binary image.

In some implementations, an illumination source is controlled to illuminate in sequence with images captured by the camera in an alternating pattern such that a first image captured by the camera is captured when the illumination source is illuminated and a second image captured by the camera is captured when the illumination source is not illuminated. In these implementations, a camera image captured while the illumination source is turned off may be subtracted from a camera image captured while the illumination source was turned on to produce a resulting image. The resulting image may be analyzed to determine whether one or more objects are illuminated in the camera image captured when the illumination source was turned on. Subtracting the camera image captured when the illumination source was turned off may remove ambient light which was present in both camera images.

Returning to FIG. 3, for objects in the active touch area, the computing device 240 determines a defined region that corresponds to a detected object (370). For instance, the computing device 240 compares a position of the detected object in the accessed images to the defined regions within the field of view of the camera 210 and determines in which, if any, of the defined regions the detected object is positioned.

The computing device 240 determines a command based on the determined region (380). The computing device 240 may identify an input command that corresponds to an interface control displayed in the determined region. For example, the computing device 240 may determine to execute a "Play" command when a play input control is displayed on the display device 220 at a position corresponding to determined region. As another example and referring to FIG. 4, the computing device 240 may determine a command to execute that corresponds to the control 421.

In some implementations, the computing device 240 may determine a position of the object within the determined region to select a particular command when multiple commands are associated with the determined region. In these implementations, a sliding knob input control may be displayed on the display device 220 at a position corresponding to the determined region. The sliding knob input control may select a picture to display on the display device 220 from among multiple possible pictures based on a position of the knob in the sliding knob input control. The selected picture (or position of the knob in the sliding knob input control) may be determined based on the position of the object within the determined region. In other examples, the sliding knob input control may control a volume of a speaker or may control a zoom setting of a display.

Figure 6:
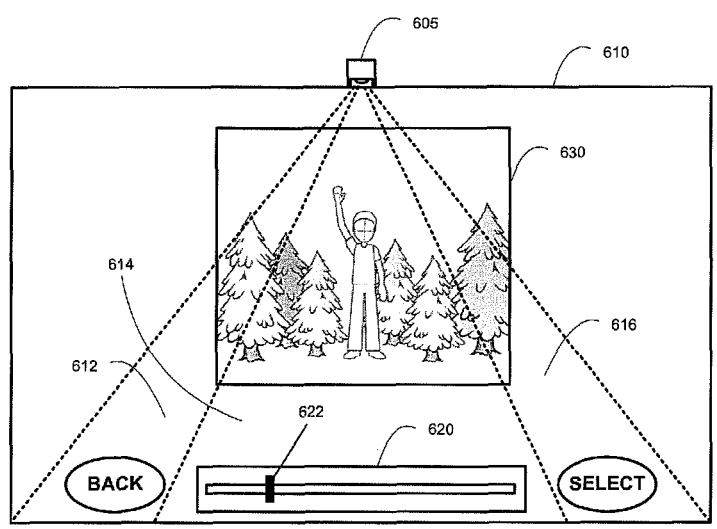

For example, FIG. 6 illustrates a system 600 which includes a camera 605 placed on top of a display device 610. The field-of-view of the camera 605 is divided into regions 612-616. A sliding knob input control 620 is displayed at a position in the display device 610 corresponding to the region 614. The control 620 includes a "knob" 622. The position of the knob 622 may be determined, for example, based on the horizontal position of a user's finger within the region 614. An image selected from among a sequence of multiple possible images may be displayed in an image area 630 based on the horizontal position of the knob 622 in the control 620. For example, if the user touches the display device 610 with their finger at a position corresponding to the left portion of the region 614, an image which is located at the beginning portion of the sequence of multiple possible images may be selected and displayed in the image area 630. As another example, if the user touches the display device 610 at a position corresponding to the right portion of the region 614, an image which is located at the end portion of the sequence of multiple possible images may be selected and displayed in the image area 630.

Returning to FIG. 3, the computing device 240 detects a gesture in the determined region and determines a command based on the detected gesture (390). The computing device 240 may detect a gesture in the determined region by comparing motion of the detected object within the determined region to motion patterns associated with recognized gestures. When the motion of the detected object matches a motion pattern associated with a recognized gesture, the computing device 240 identifies performance of the recognized gesture and determines a command corresponding to the recognized gesture. For instance, in the example of FIG. 6, the user may perform a "left swipe" gesture with their finger. The computing device 240 may recognize the left swipe gesture and may determine and execute a "next image" command, resulting in the display of a new image in the image area 630, where the new image is next after the currently displayed image in the sequence of multiple possible images. As another example, the user may perform a "right swipe" gesture with their hand or finger. The computing device 240 may recognize the right swipe gesture and may determine and execute a "previous image" command.

In some examples, a turning knob control (e.g., a dial) may be displayed in the determined region, and the computing device 240 may determine a command based on a position of the turning knob control (e.g., an amount the turning knob control has been rotated). In these examples, the computing device 240 may detect a user performing a gesture in which the user draws a circle with the detected object within the determined region. The computing device 240 may rotate the turning knob control in a direction that is based on whether the user draws the circle in a clockwise direction or a counterclockwise direction, and may determine a command based on the position of the turning knob control after rotation.

Figure 7:
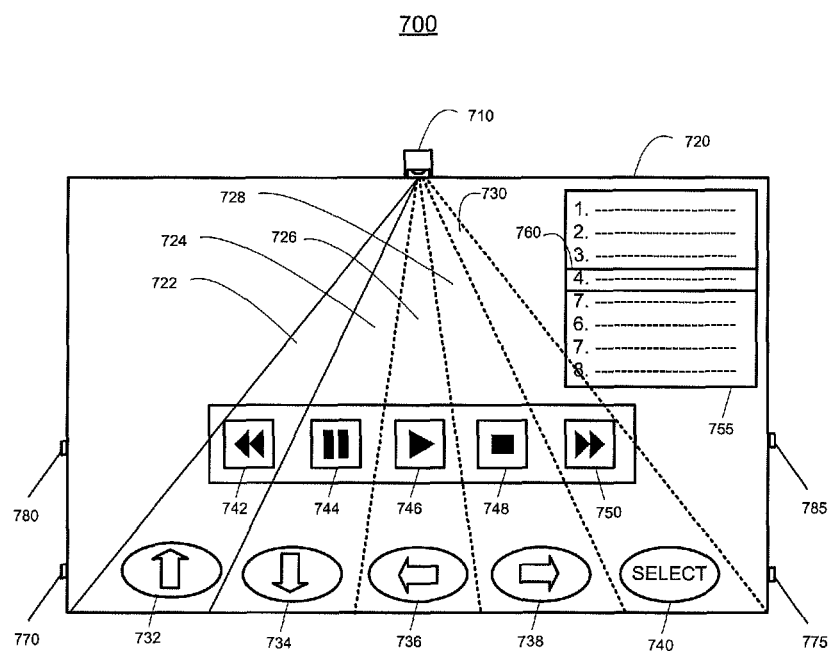

FIG. 7 illustrates a system 700 in which multiple controls are displayed in the same region. The system 700 includes a camera 710 placed on top of a display device 720. The field-of-view of the camera 710 is divided into multiple regions 722-730. An image of an interface for a music player application is displayed on the display device 720. The music player application includes button controls 732-740, which are displayed in areas of the display device 720 corresponding to the regions 722-730, respectively. The music player application also includes button controls 742-750, which are also displayed in areas of the display device 720 corresponding to the regions 722-730, respectively.

The button controls 732-750 may be used to control the music player application. For example, button 746 is a play button which may be used to play a song currently selected in a play list 755 (an indicator 760 indicates the currently selected song in the play list 755). The button controls 742-744 and 748-750 may be used to rewind, pause, stop, and fast forward the currently playing song, respectively. Button controls 732-734 may be used to select a different song in the play list 755 by moving the indicator 760 up or down, respectively. Button controls 736-738 may be used to decrease or increase the playback volume, respectively. Button control 740 may be used, for example, to play the selected song or may be used to display details about the selected song.

As shown in FIG. 7, each region 722-730 includes multiple controls. For example, region 726 includes both the control 746 and the control 736. If the camera 710 detects a user's finger in the region 726, it may be ambiguous as to which of the control 736 or the control 746 the user intended to select. To avoid this ambiguity, user interfaces may be designed so that each region only includes one control, and additionally, user interfaces may be designed to avoid placing graphics that are visually similar to buttons, scroll bars, or other controls in false touch areas that are not meant to be interactive.

An approach of using multiple sets of illuminators may be used to support having multiple controls in the same region. For example, a first pair of LEDs 770-775 may illuminate the area of the display device 720 corresponding to the button controls 732-740 and a second pair of LEDs 780-785 may illuminate the area of the display device 720 corresponding to the button controls 742-750. The LED pairs 770-775 and 780-785 may be illuminated at alternating times, so that the camera 710 captures a first camera image while the LEDs 770-775 are illuminated and captures a second camera image while the LEDs 780-785 are illuminated.

Depending upon which camera image the object is detected in, the computing device 240 may determine whether the user is selecting one of the controls 732-740 or one of the controls 742-750. For example, if an object is detected in the region 724 when the LEDs 780-785 are illuminated, the computing device 240 may identify and execute a pause command associated with the control 744. As another example, if the object is detected in the region 728 when the LEDs 770-775 are illuminated, the computing device 240 may identify and execute an increase volume command associated with the control 738. In some examples, more than two pairs of LEDs may be used, to illuminate more than two areas of the display device 720.

Figure 8:
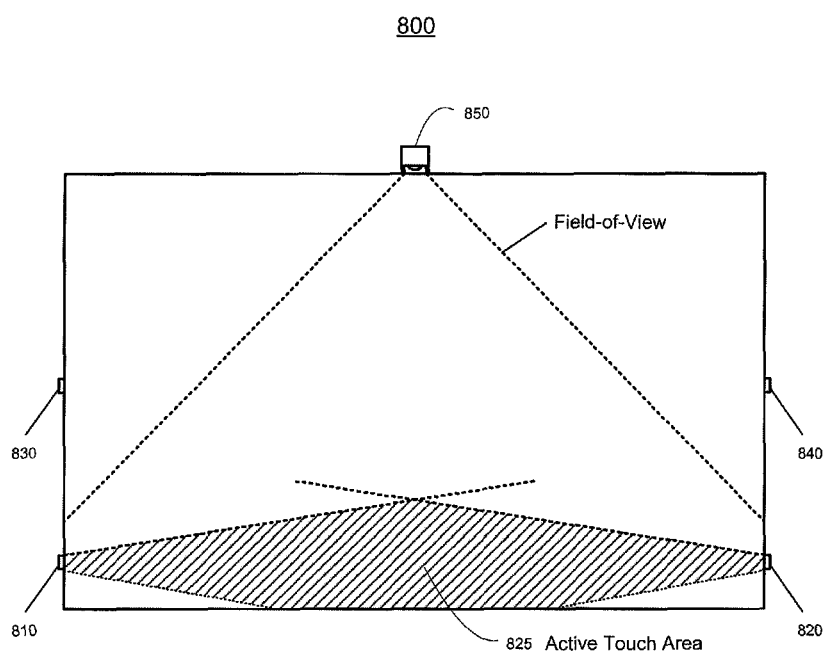

FIG. 8 illustrates an active touch area for a system 800 which includes multiple pairs of illuminators. The system 800 includes LEDs 810-820, which create an active touch area 825 when illuminated. The LEDs 810-820 may be illuminated at alternating times with LEDs 830-840, in sequence with images captured by a camera 850. The illumination of LEDs 830-840 may create a second active touch area (not shown), which is positioned above the active touch area 825. The captured camera images may result in a first set of images in which the LEDs 810-820 are illuminated and the LEDs 830-840 are not illuminated, and in a second set of images in which the LEDs 830-840 are illuminated and the LEDs 810-820 are not illuminated. The first set of images may be processed to determine whether an object is detected within the active touch area 825 and the second set of images may be processed to determine whether an object is detected within the second active touch area. When an object is detected within the second active touch area, movement of the detected object may be tracked to determine whether a recognized gesture is performed in the second active touch area.

Figure 9:
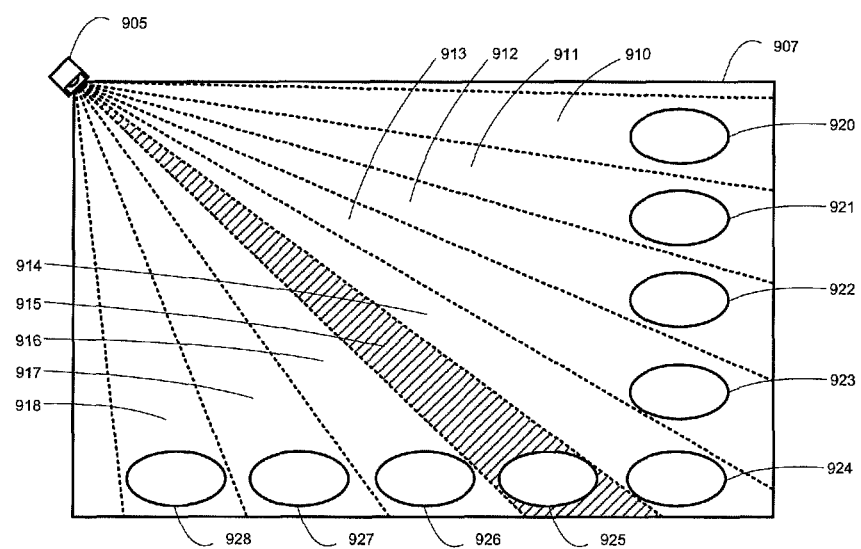

FIG. 9 illustrates a system 900 which includes a camera 905 positioned in a corner of a display device 907. The camera 905 is positioned in the upper left corner of the display device 907 (e.g., where the left side of the display device 907 meets the top side of the display device 907). Using a configuration where the camera 905 is positioned in a corner of the display device 907 may allow for user interface controls to be placed along the two sides opposite the camera 905 (e.g., as shown in FIG. 9, the camera is placed in the upper left corner of the display device 907 and user interface controls 920-924 are aligned along the right edge of the display device 907 and user interface controls 924-928 are aligned along the bottom edge of the display device 907. The user interface controls 920-928 correspond to regions 910-918, respectively. The regions 910-918 divide the field-of-view of the camera 905.

Figure 10:
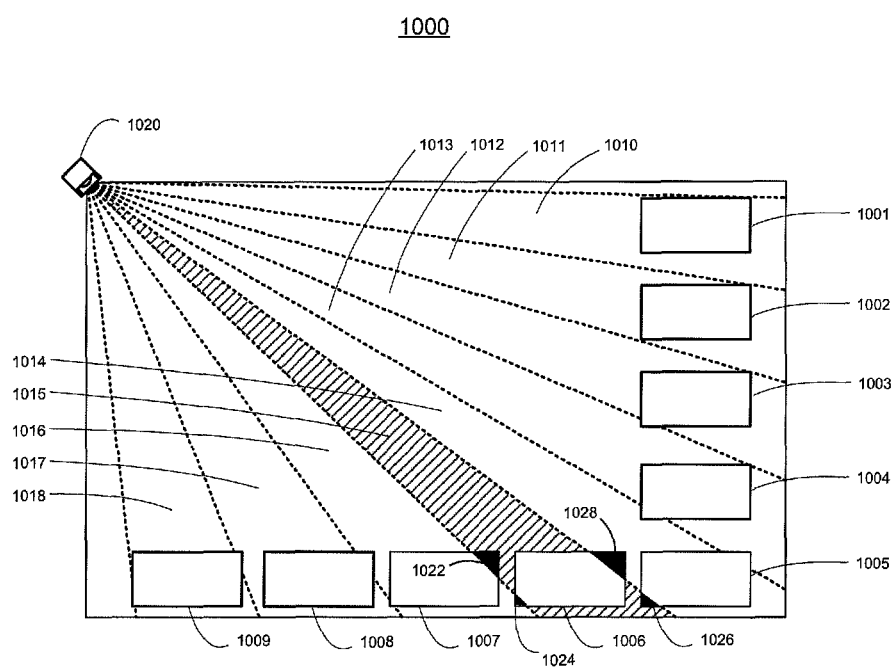

As shown in FIG. 9, using oval-shaped interface controls may allow for controls to fit inside of corresponding regions. Other types of control shapes may not generally fit well within corresponding regions when using a camera and region configuration used in the system 900. For example, FIG. 10 illustrates a system 1000 which is similar to the system 900 except that rectangular-shaped controls 1001-1009 are used. The controls 1001-1009 correspond to regions 1010-1018 which divide a field-of-view of a camera 1020. Some of the rectangular-shaped controls 1001-1009 do not fit within the corresponding regions 1010-1018, as illustrated by clipped portions 1022-1028.

Figure 11:
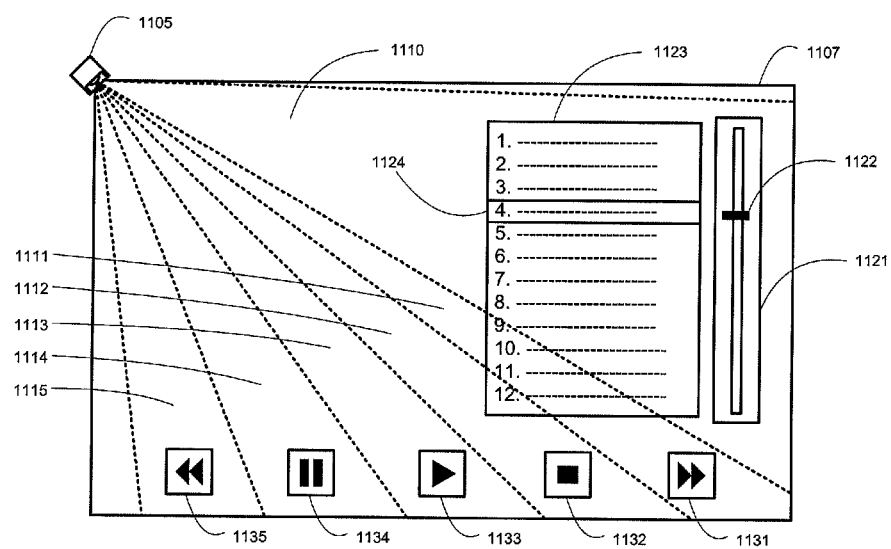

The configuration of the system 900 may allow for a vertical scroll bar control. For example, FIG. 11 illustrates a system 1100 which is similar to the system 900 in that a camera 1105 is positioned in the upper left corner of a display device 1107. Regions 1110-1115 divide the field-of-view of the camera 1105. A scroll bar control 1121 is located in a region of the display device 1107 corresponding to the region 1110. The region 1110 is sized so that it is larger than each of the regions 1111-1115, and is sized to accommodate the height of the scroll bar control 1121. The scroll bar control 1121 includes a slider 1122 which may be moved up and down to select a song from a play list 1123. An indicator 1124 indicates the currently selected song in the play list 1123. Button controls 1131-1135 may be used to fast forward, stop, play, pause, or rewind a song, respectively.

Figure 12:
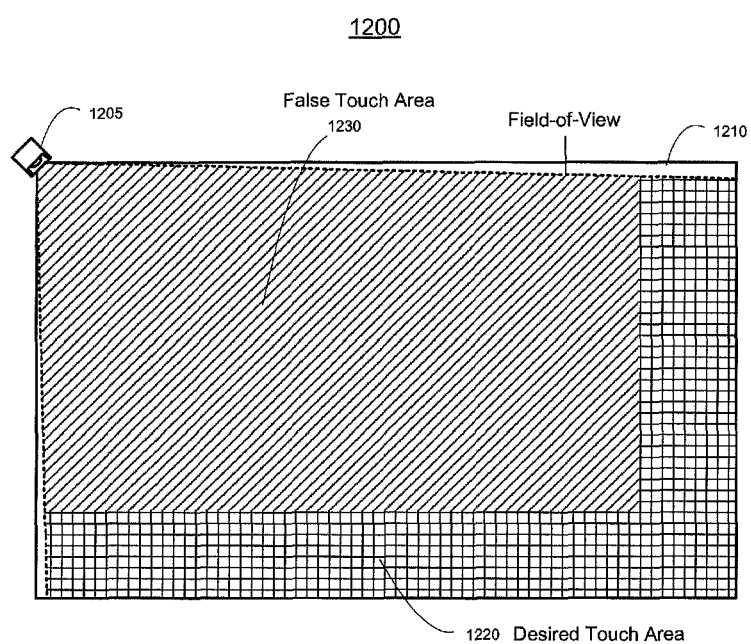

When using a configuration such as that used in the system 900 or the system 1100, desired touch and false touch areas may be defined. For example, FIG. 12 illustrates a system 1200 which includes a camera 1205 positioned in the upper left corner of a display device 1210. A desired touch area 1220 may be defined at the bottom and right sides of the intersection of the field-of-view of the camera 1205 and the display device 1210. The area of the field-of-view of the camera 1205 located above or to the left of the desired touch area 1220 may be defined as a false touch area 1230. When designing user interfaces, it may be desirable to place controls in the desired touch area 1220 and to avoid placing controls or graphics resembling controls in the false touch area 1230.

Figure 13:
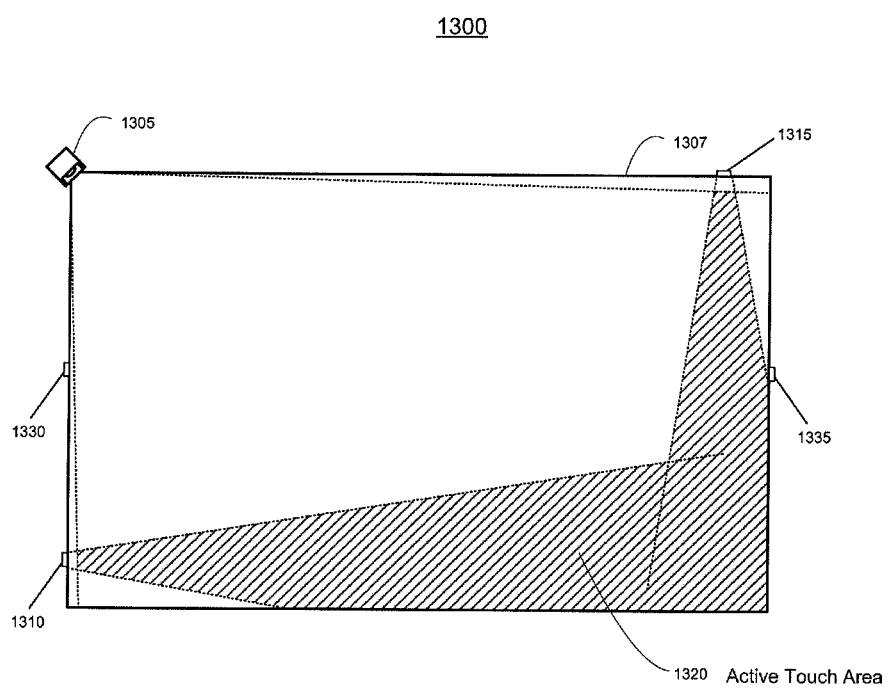

FIG. 13 illustrates a system 1300 for defining active touch areas. The system 1300 includes a camera 1305 positioned at the top left corner of a display device 1307. LEDs 1310 and 1315 may be illuminated to define an active touch area 1320. Objects in the field-of-view of the camera 1305 in the area of the display device 1307 corresponding to the active touch area 1320 may be recognized, while objects located in the field-of-view of the camera 1305 but outside the active touch area 1320 may be ignored. However, objects may be detected in the center of the display device 1307 (e.g., outside of the active touch area 1320) by illuminating LEDs 1330-1335. For example, objects may be detected in the center of the display device 1307 while an application is in a gesture recognition mode. In a gesture recognition mode, camera images may be processed without a segmentation of the field-of-view of the camera 1305 into regions (e.g., a gesture may be recognized regardless of where in the field-of-view the gesture was performed).

Figure 14:
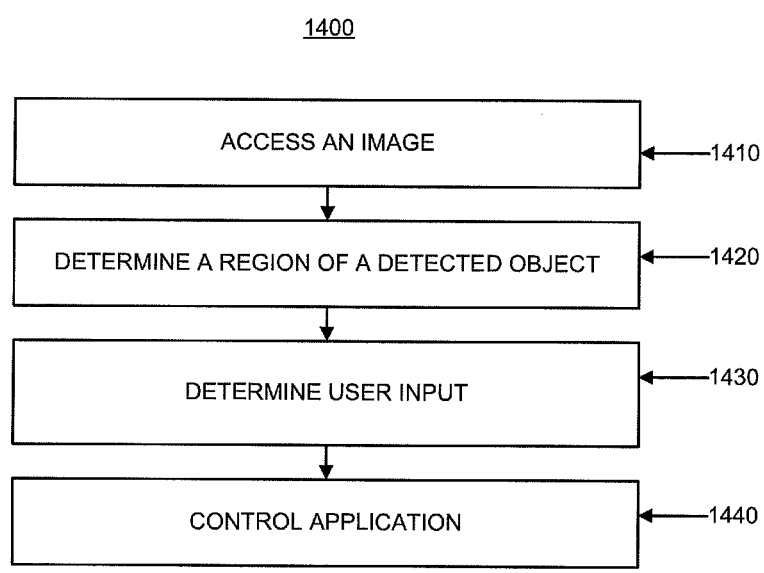

FIG. 14 is a flow chart illustrating an example of a process 1400 for determining user input commands and controlling an application using a camera tracker system. For convenience, particular components described with respect to FIG. 2 are referenced as performing the process 1400. However, similar methodologies may be applied in other implementations where different components are used to define the structure of the system, or where the functionality is distributed differently among the components.

The computing device 240 accesses an image captured by the camera (1410). For example, the computing device 240 may control the camera 210 to capture one or more images and receive the one or more images from the camera 210. The computing device 240 also may access one or images from a storage medium. The computing device 240 may continuously access images or may access images in response to input commands received by the system 200.

The computing device 240 determines, from among multiple defined regions within a field of view of the camera, a region in which an object detected within the accessed image is positioned (1420). For example, in reference to FIG. 1, the computing device 240 may detect an object in an image captured by the camera 110 and determine, from among the regions 112-116, a region in which the object is positioned.

In some implementations, the computing device 240 detects an object within the accessed image and determines a position of the detected object within the accessed image. Any technique to detect an object within an image and determine a position of the detected object may be used. The computing device 240 compares the determined position to the multiple defined regions within the field of view of the camera and, based on comparison results, identifies the region in which the detected object is positioned. For instance, the computing device 240 compares location coordinates of the detected object in the accessed image (e.g., a pixel location) to data defining location coordinates (e.g., pixel locations) of a defined region within the accessed camera image.

In some examples, the computing device 240 segments the accessed image into segments that each correspond to one of the multiple defined regions. In these examples, the computing device 240 may, for each of the segments, analyze the segment to determine whether an object is present within the segment. In response to a determination that an object is present within a particular segment, the computing device 240 determines that the object is positioned within a particular region that corresponds to the particular segment. In these examples, the segment may be the only portion of the image analyzed to determine whether an object is present within the segment. In addition, the computing device 240 may determine that an object is present within a segment when the entire object is present within any portion of the segment.

The computing device 240 determines user input based on the determined region (1430). For instance, an interface control may be displayed at a position corresponding to the determined region. The computing device 240 may map the determined region to the interface control and determine that a user has provided input to activate the interface control.

In some implementations, a gesture may be detected based on positions of the object detected within a series of images and a user input command may be determined based on the recognized gesture. For example, a "swipe" user input may be detected and a "change station" or "next picture" user input may be determined based on the recognized swipe gesture.

The computing device 240 controls an application based on the determined user input (1440). For example, the computing device 240 may trigger an operation within the application that corresponds to the determined user input. In this example, when the determined user input is activation of an interface control (e.g., a press of an interface button), the computing device 240 controls the application to perform an operation that is associated with activation of the interface control.

Figure 15:
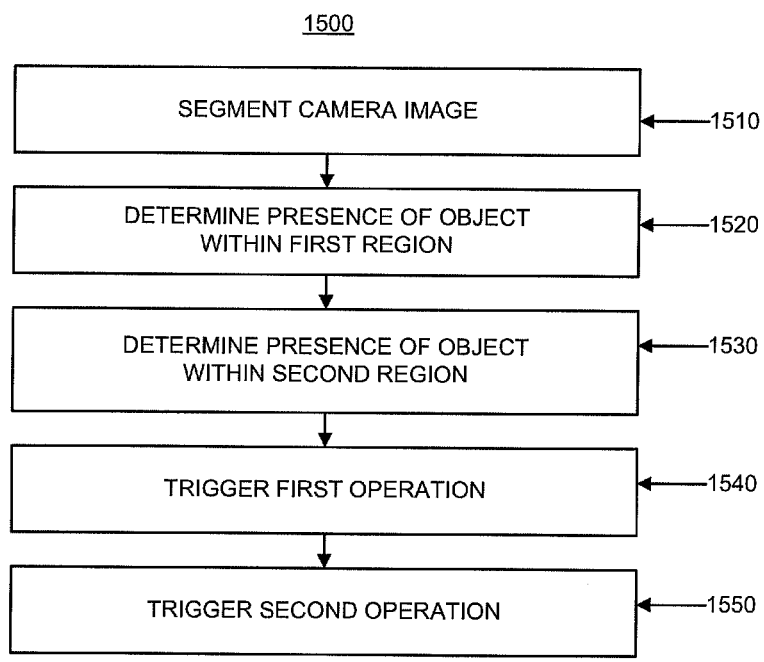

FIG. 15 is a flow chart illustrating another example of a process 1500 for determining user input commands in a camera tracker system. For convenience, particular components described with respect to FIG. 2 are referenced as performing the process 1500. However, similar methodologies may be applied in other implementations where different components are used to define the structure of the system, or where the functionality is distributed differently among the components.

The computing device 240 segments an image captured by the camera into a first region that corresponds to a first user interface control and a second region that corresponds to a second user interface control, where the first region of the image is different than the second region of the image (1510). For example, in reference to FIG. 1, the computing device 240 may segment an image captured by the camera 110 into the regions 112-116, where the region 112 corresponds to the control 120 and the region 116 corresponds to the control 122.

The computing device 240 determines whether an object is present within the first region of the image based on an analysis of the segmented first region of the image (1520). For example, in reference to FIG. 1, suppose that while the camera image was captured, the user was touching the region 112 of the display device 105. For example, the user's finger may be detected by comparing pixels of the camera image to a brightness threshold to produce a binary image and by clustering pixels within the binary image into one or more blobs. A centroid of a blob may be computed as the position of the corresponding detected object and the detected object position may be compared to positions which define the regions 112-116. In this example, the computing device 240 may determine that an object is present within the region 112.

The computing device 240 may determine whether an object is present within the first region of the image based on an analysis of only the segmented first region of the image. For instance, in the example of FIG. 1, the region 112 but not the regions 114-116 might be analyzed. The computing device 240 may determine whether an object is present within any portion of the first region of the image.

The computing device 240 determines whether an object is present within the second region of the image based on an analysis of the segmented second region of the image (1530). Using the example described above in reference to reference numeral 1520, the computing device 240 may determine that no objects are detected in the region 116.

Similar to the processing for the first image, the computing device 240 may determine whether an object is present within the second region of the image based on an analysis of only the segmented second region of the image. For instance, in the example of FIG. 1, the region 116 but not the regions 112-114 might be analyzed. The computing device 240 may determine whether an object is present within any portion of the second region of the image.

In response to a determination that an object is present within the first region of the image, the computing device 240 detects activation of the first user interface control and triggers a first operation associated with activation of the first user interface control (1540). For example, in the example above where an object is detected in region 112 of FIG. 1, the computing device 240 may detect activation of the "BACK" button control 120. A "previous image" command may be determined and executed, resulting in the display of the thumbnail 128a in the image area 126 and in the positioning of the indicator 130 above the thumbnail 128a.

The computing device 240 may detect activation of the first user interface control in response to a determination that an object is present within the first region of the image regardless of a portion of the first region of the image at which the object is located. For instance, in the example of FIG. 1, the "BACK" button control may be activated if the object is detected in any location within the region 112.

In response to a determination that an object is present within the second region of the image, the computing device 240 detects activation of the second user interface control and triggers a second operation associated with activation of the second user interface control (1550). Suppose that in the example above that an object is detected in region 116 of FIG. 1 instead of in region 112. The computing device 240 may detect activation of the corresponding "FORWARD" button control 122. A "next image" command may be determined and executed, resulting in the display of the thumbnail 128c in the image area 126 and in the positioning of the indicator 130 above the thumbnail 128c.

Figure 16:
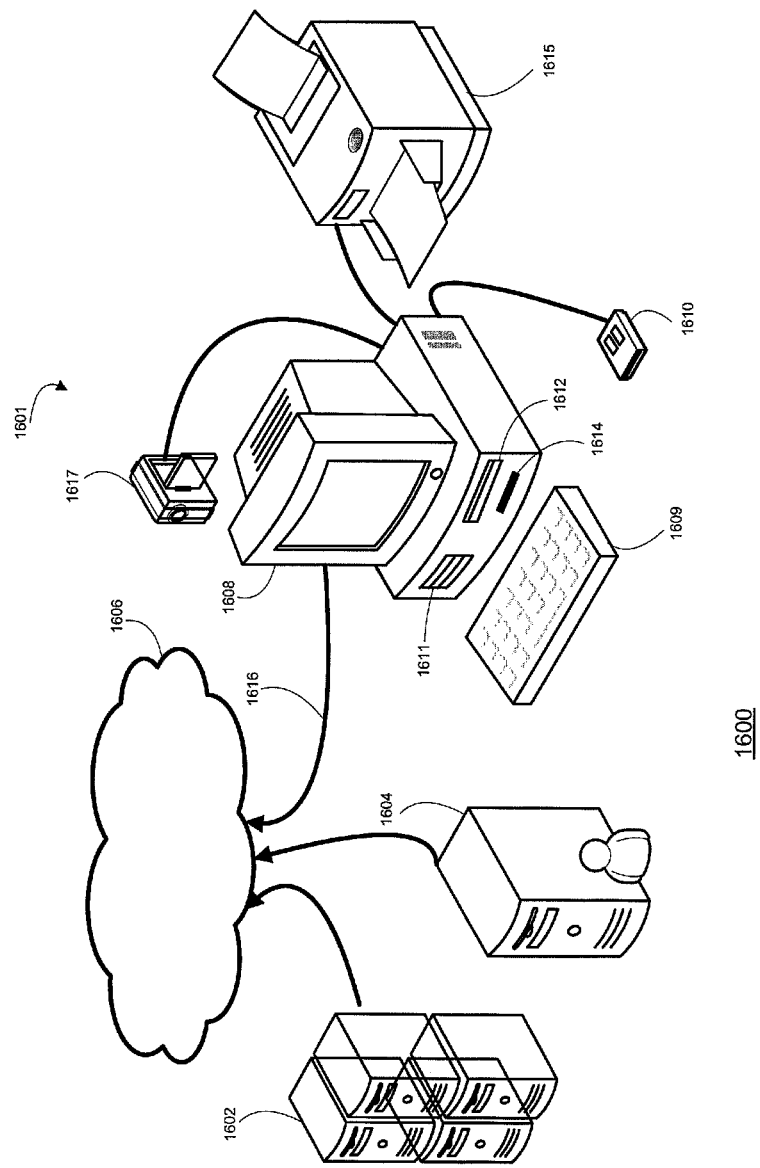

FIG. 16 illustrates components of an exemplary computer processing system. Briefly, the system 1600 includes a computing device 1601 that includes a processor configured to control an application that is configured to enable a user to enter text, numbers, or select from a menu of options. The device 1601 may be configured to exchange electronic communications over a network 1606 with one or more servers including a server 1602 and a server 1604.

In more detail, the hardware environment of the computing device 1601 includes a display monitor 1608 for displaying text and images to a user, a keyboard 1609 for entering text data and user commands into the computing device 1601, a mouse 1610 for pointing, selecting and manipulating objects displayed on the display monitor 1608, a fixed disk drive 1611, a removable disk drive 1612, a tape drive 1614, a hardcopy output device 1615, a computer network connection 1616, and a digital input device 1617.

The display monitor 1608 displays the graphics, images, and text that comprise the user interface for the software applications used by the computing device 1601, as well as the operating system programs necessary to operate the computing device 1601. A user uses the keyboard 1609 to enter commands and data to operate and control the computer operating system programs as well as the application programs. The mouse 1610 may be any type of pointing device, and may be a joystick, a trackball, a touch-pad, or other pointing device. Software used to display a user interface and enable a user to enter text, numbers, or select from a menu of options is stored locally on computer readable memory media, such as the fixed disk drive 1611.

In a further implementation, the fixed disk drive 1611 itself may include a number of physical drive units, such as a redundant array of independent disks ("RAID"), or may be a disk drive farm or a disk array that is physically located in a separate computing unit. Such computer readable memory media allow the computing device 1601 to access computer-executable process steps, application programs and the like, stored on removable and non-removable memory media.

The computer network connection 1616 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 1606 may be a LAN network, a corporate or government WAN network, the Internet, or other network.

The computer network connection 1616 may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, an IEEE® FIREWIRE® connector, a Universal Serial Bus ("USB") connector, a serial port connector, a parallel port connector, or other wireline connector.

The removable disk drive 1612 is a removable storage device that is used to off-load data from the computing device 1601 or upload data onto the computing device 1601. The removable disk drive 1612 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 1611 or on removable media for the removable disk drive 1612.

The tape drive 1614 is a tape storage device that is used to off-load data from the computing device 1601 or to upload data onto the computing device 1601. The tape drive 1614 may be a quarter-inch cartridge ("QIC"), 4 mm digital audio tape ("DAT"), 8 mm digital linear tape ("DLT") drive, or other type of tape.

The hardcopy output device 1615 provides an output function for the operating system programs and applications. The hardcopy output device 1615 may be a printer or any output device that produces tangible output objects, including textual or image data or graphical representations of textual or image data. While the hardcopy output device 1615 is depicted as being directly connected to the computing device 1601, it need not be. For instance, the hardcopy output device may be connected to the computing device 1601 via a network interface, such as a wireline or wireless network.

Furthermore, although the computing device 1601 is described above as a desktop PC, in further implementations the computing device 1601 may be a laptop, a workstation, a midrange computer, a mainframe, an embedded system, telephone, a handheld or tablet computer, a PDA, or other type of computer.

Figure 17:
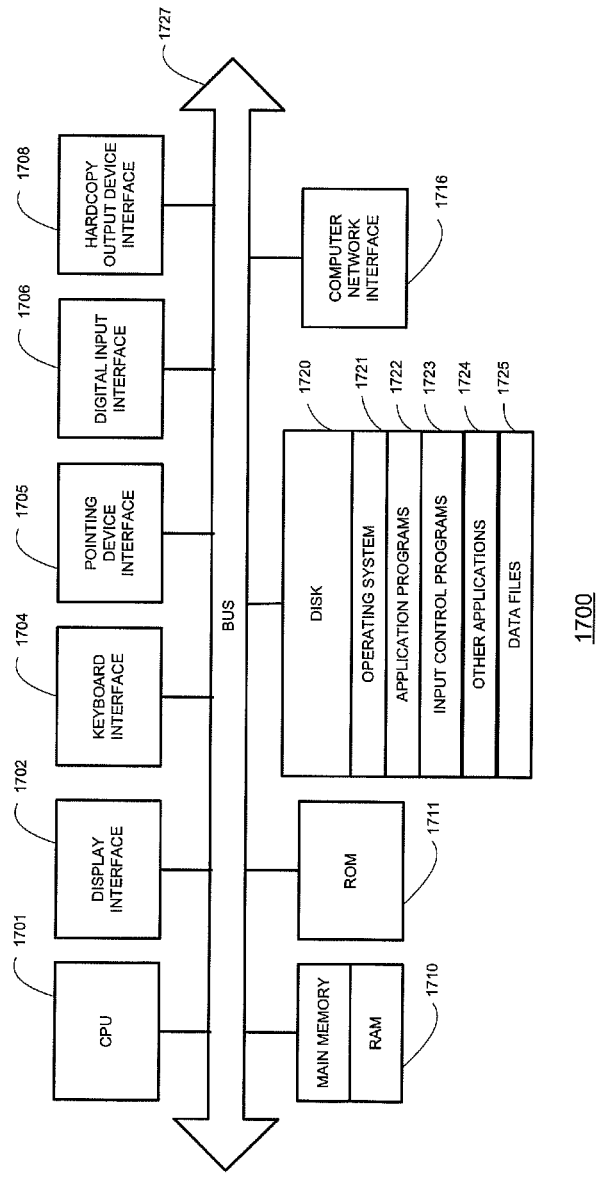

FIG. 17 is a block diagram illustrating the internal architecture of a computer shown in FIG. 16. An exemplary internal architecture of the computing device 1601 is now described. The computing environment includes a computer central processing unit ("CPU") 1701, where the computer instructions that comprise an operating system or an application are processed; a display interface 1702 which provides a communication interface and processing functions for rendering graphics, images, and texts on the display monitor 1608; a keyboard interface 1704 which provides a communication interface to the keyboard 1609; a pointing device interface 1705 which provides a communication interface to the mouse 1610 or an equivalent pointing device; a digital input interface 1706 which provides a communication interface to the digital input device 1617; a hardcopy output device interface 1708 which provides a communication interface to the hardcopy output device 1615; a random access memory ("RAM") 1710 where computer instructions and data are stored in a volatile memory device for processing by the computer CPU 1701; a read-only memory ("ROM") 1711 where invariant low-level systems code or data for basic system functions such as basic input and output ("I/O"), startup, or reception of keystrokes from the keyboard 1609 are stored in a non-volatile memory device; and a storage 1720 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 1721, application programs 1722 (including the user input application 1723, and other applications 1724 as necessary) and data files 1725 are stored; a computer network interface 1716 which provides a communication interface to the network 1606 over the computer network connection 1616. The constituent devices and the computer CPU 1701 communicate with each other over the computer bus 1727.

The RAM 1710 interfaces with the computer bus 1727 so as to provide quick RAM storage to the computer CPU 1701 during the execution of software programs such as the operating system application programs, and device drivers. More specifically, the computer CPU 1701 loads computer-executable process steps from the fixed disk drive 1611 or other memory media into a field of the RAM 1710 in order to execute software programs. Data is stored in the RAM 1710, where the data is accessed by the computer CPU 1701 during execution.

The computing device 1601 stores computer-executable code for an operating system 1721, application programs 1722 such as word processing, spreadsheet, presentation, gaming, or other applications. Although it is possible to display a user interface and enable a user to enter text, numbers, or select from a menu of options using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 1701 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 1701 is more than one processing unit, including a multiple CPU configuration found in high-performance workstations and servers, or a multiple scalable processing unit found in mainframes.

The operating system 1721 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1721 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 16 and 17 illustrate one possible implementation of a computing device that executes program code, or program or process steps, configured to effectuate control of an application that is configured to enable a user to enter text, numbers, or select from a menu of options, other types of computers may also be used as well.

A number of implementations have been described. Nevertheless, it will be understood that various modifications may be made without departing from the spirit and scope of the disclosure. Accordingly, other implementations are within the scope of the following claims.

What is claimed is:

1. An electronic device comprising:
 a display screen configured to display a graphical user interface that includes a first user interface control displayed at a first position in the graphical user interface and a second user interface control displayed at a second position in the graphical user interface, the second position in the graphical user interface being different than the first position in the graphical user interface;

a camera oriented to capture images across a tangible surface of the display screen;

an illuminator configured to illuminate a part of the tangible surface; and a processing unit configured to perform operations comprising:

accessing an image captured by the camera;

identifying multiple regions that are defined within a field of view of the camera and that each correspond to one interface control positioned on the tangible surface;

determining, from among the multiple defined regions, a region in which an object detected within the accessed image is positioned, including:

determining whether an object is present within a first region of the image that corresponds to the first user interface control, and determining whether an object is present within a second region of the image that corresponds to the second user interface control;

determining user input based on the one interface control that corresponds to the determined region and the part of the tangible surface illuminated by the illuminator; and controlling an application based on the determined user input;

wherein determining user input based on the one interface control that corresponds to the determined region and controlling an application based on the determined user input comprises:

in response to a determination that an object is present within the first region of the image, detecting activation of the first user interface control and triggering a first operation associated with activation of the first user interface control; and in response to a determination that an object is present within the second region of the image, detecting activation of the second user interface control and triggering a second operation associated with activation of the second user interface control.

2. The electronic device of claim 1 wherein determining, from among the multiple defined regions, a region in which an object detected within the accessed image is positioned comprises:

segmenting the accessed image into segments that each correspond to one of the multiple defined regions;

for each of the segments, analyzing the segment to determine whether an object is present within the segment; and in response to a determination that an object is present within a particular segment, determining that the object is positioned within a particular region that corresponds to the particular segment.

3. The electronic device of claim 2 wherein determining that the object is positioned within a particular region that corresponds to the particular segment comprises determining that the entire object is present within any portion of the particular region.

4. The electronic device of claim 2 wherein the segment is the only portion of the image analyzed to determine whether an object is present within the segment.

5. The electronic device of claim 1 wherein the processing unit is configured to perform operations further comprising controlling the display screen to size and shape the first user interface control to fit within the first region of the image and to size and shape the second user interface control to fit within the second region of the image.

6. The electronic device of claim 1:

wherein the first user interface control is a first user interface button; and wherein detecting activation of the first user interface control and triggering the first operation associated with activation of the first user interface control comprises detecting a press of the first user interface button and triggering a first operation associated with a press of the first user interface button.

7. The electronic device of claim 1:

wherein the first user interface control is a first slider control that spans the first region of the image in a direction that intersects the field of view of the camera; and wherein detecting activation of the first user interface control and triggering the first operation associated with activation of the first user interface control comprises:

detecting engagement of the first slider control in response to a determination that an object is present within the first region of the image;

determining a position of the object within the first region of the image along the first slider control; and triggering a first operation that is associated with engagement of the first slider control and that uses the determined position of the object within the first region of the image along the first slider control.

8. The electronic device of claim 1 wherein the illuminator comprises a light emitting diode oriented to direct light across the tangible surface of the display screen in a direction that intersects the first region of the image and the second region of the image.

9. The electronic device of claim 8 wherein the light emitting diode directs light across a part of the first region of the image to define an active area in the part of the first region of the image in which the light from the light emitting diode is directed and a false area in a remainder of the first region of the image in which light from the light emitting diode is absent, the first position in the graphical user interface at which the first user interface control is displayed corresponding to the active area of the first region of the image.

10. The electronic device of claim 9 wherein determining whether an object is present within the first region of the image comprises determining whether an illuminated object is present within the first region of the image to detect objects in the active area of the first region of the image and ignore objects in the false area of the first region of the image.

11. The electronic device of claim 10 wherein the light emitting diode is a first light emitting diode configured to illuminate a first area above the display screen, further comprising a second illuminator having a second light emitting diode oriented to direct light across the tangible surface of the display screen and configured to illuminate a second area above the display screen that is different than the first area above the display screen illuminated by the first light emitting diode.

12. The electronic device of claim 11 wherein the second area above the display screen illuminated by the second light emitting diode defines a gesture input area and the processing unit is configured to perform operations further comprising detecting gestures within the second area based on an analysis of multiple images captured by the camera.

13. The electronic device of claim 12 wherein the processing unit is configured to perform operations further comprising:

controlling the first light emitting diode and the second light emitting diode to illuminate at alternating times in sequence with images captured by the camera, the images captured by the camera resulting in a first set of images in which the first light emitting diode is illuminated and the second light emitting diode is not illuminated and a second set of images in which the second light emitting diode is illuminated and the first light emitting diode is not illuminated;

processing the first set of images in which the first light emitting diode is illuminated and the second light emitting diode is not illuminated to detect activation of the first user interface control; and processing the second set of images in which the first light emitting diode is not illuminated and the second light emitting diode is illuminated to detect gestures within the second area.

14. The electronic device of claim 1 wherein the processing unit is configured to perform operations further comprising ignoring portions of the image other than the multiple defined regions of the image such that objects located in portions of the image other than the multiple defined regions of the image are ignored.

15. The electronic device of claim 1:
wherein determining, from among the multiple defined regions, a region in which an object detected within the accessed image is positioned comprises detecting performance of a gesture by an object within the region of the image based on an analysis of multiple images captured by the camera; and
wherein determining user input comprises determining a user input command that corresponds to the detected gesture; and
wherein controlling an application based on the determined user input comprises triggering a first operation that corresponds to the determined user input command.

16. The electronic device of claim 15:
wherein detecting performance of a gesture by an object within the region of the image based on an analysis of multiple images captured by the camera comprises detecting performance of a swiping gesture within the region of the image and a direction of the swiping gesture; and
wherein determining a user input command that corresponds to the detected gesture comprises determining a user input command that corresponds to the swiping gesture in the determined direction of the swiping gesture.

17. At least one non-transitory computer-readable medium encoded with executable instructions that, when executed by at least one processor, cause the at least one processor to perform operations comprising:
accessing an image captured by a camera oriented to capture images across a tangible surface of a display screen displaying a graphical user interface that includes a first user interface control displayed at a first position in the graphical user interface and a second user interface control displayed at a second position in the graphical user interface, the second position in the graphical user interface being different than the first position in the graphical user interface;
causing an illuminator to illuminate a part of the tangible surface;
identifying multiple regions that are defined within a field of view of the camera and that each correspond to one interface control positioned on the tangible surface;
determining, from among the multiple defined regions, a region in which an object detected within the accessed image is positioned, including:
determining whether an object is present within a first region of the image that corresponds to the first user interface control, and
determining whether an object is present within a second region of the image that corresponds to the second user interface control;
determining user input based on the one interface control that corresponds to the determined region and the part of the tangible surface illuminated by the illuminator; and
controlling an application based on the determined user input;
wherein determining user input based on the one interface control that corresponds to the determined region and controlling an application based on the determined user input comprises:
in response to a determination that an object is present within the first region of the image, detecting activation of the first user interface control and triggering a first operation associated with activation of the first user interface control: and
in response to a determination that an object is present within the second region of the image, detecting activation of the second user interface control and triggering a second operation associated with activation of the second user interface control.

18. A method comprising:
accessing an image captured by a camera oriented to capture images across a tangible surface of a display screen displaying a graphical user interface that includes a first user interface control displayed at a first position in the graphical user interface and a second user interface control displayed at a second position in the graphical user interface, the second position in the graphical user interface being different than the first position in the graphical user interface;
causing an illuminator to illuminate a part of the tangible surface;
identifying multiple regions that are defined within a field of view of the camera and that each correspond to one interface control positioned on the tangible surface;
determining, from among the multiple defined regions, a region in which an object detected within the accessed image is positioned, including:
determining whether an object is present within a first region of the image that corresponds to the first user interface control, and
determining whether an object is present within a second region of the image that corresponds to the second user interface control;
determining user input based on the one interface control that corresponds to the determined region and the part of the tangible surface illuminated by the illuminator; and
controlling an application based on the determined user input;
wherein determining user input based on the one interface control that corresponds to the determined region and controlling an application based on the determined user input comprises:
in response to a determination that an object is present within the first region of the image, detecting activation of the first user interface control and triggering a first operation associated with activation of the first user interface control; and
in response to a determination that an object is present within the second region of the image, detecting activation of the second user interface control and triggering a second operation associated with activation of the second user interface control.

19. An apparatus comprising:

means for accessing an image captured by a camera oriented to capture images across a tangible surface of a display screen displaying a graphical user interface that includes a first user interface control displayed at a first position in the graphical user interface and a second user interface control displayed at a second position in the graphical user interface, the second position in the graphical user interface being different than the first position in the graphical user interface;

means for causing an illuminator to illuminate a part of the tangible surface;

means for identifying multiple regions that are defined within a field of view of the camera and that each correspond to one interface control positioned on the tangible surface;

means for determining, from among the multiple defined regions, a region in which an object detected within the accessed image is positioned, including:

means for determining whether an object is present within a first region of the image that corresponds to the first user interface control, and means for determining whether an object is present within a second region of the image that corresponds to the second user interface control;

means for determining user input based on the one interface control that corresponds to the determined region and the part of the tangible surface illuminated by the illuminator; and means for controlling an application based on the determined user input wherein the means for determining user input based on the one interface control that corresponds to the determined region and the means for controlling an application based on the determined user input comprise:

means for detecting, in response to a determination that an object is present within the first region of the image, activation of the first user interface control and triggering a first operation associated with activation of the first user interface control; and means for detecting, in response to a determination that an object is present within the second region of the image, activation of the second user interface control and triggering a second operation associated with activation of the second user interface control.

20. The electronic device of claim 1 wherein the camera is configured to be on the same side of the tangible surface as a user providing the user input.

\* \* \* \* \*